United States Patent [19]

Young et al.

[11] Patent Number: 5,374,698
[45] Date of Patent: Dec. 20, 1994

[54] METHOD FOR MAKING STRUCTURED SUSPENSION PSA BEADS

[75] Inventors: Chung I. Young, St. Paul; Ying-Yuh Lu, Woodbury, both of Minn.

[73] Assignee: Minnesota Mining and Manufacturing Company, St. Paul, Minn.

[21] Appl. No.: 982,144

[22] Filed: Nov. 25, 1992

Related U.S. Application Data

[63] Continuation of Ser. No. 882,373, May 6, 1992, abandoned, which is a continuation of Ser. No. 707,848, May 30, 1991, abandoned.

[51] Int. Cl.$^5$ .................. C09J 133/08; C08F 226/10; C08F 220/10; C08F 220/06; C08F 220/56
[52] U.S. Cl. ............................... 526/264; 526/307.7; 526/318.4; 526/328.5
[58] Field of Search .................. 526/264, 307.7, 318.4, 526/328.5

[56] References Cited

U.S. PATENT DOCUMENTS

| | | | |
|---|---|---|---|
| Re. 24,906 | 12/1960 | Ulrich | 206/59 |
| 3,691,140 | 9/1972 | Silver | 260/78.5 |
| 3,786,116 | 1/1974 | Milkovich et al. | 260/885 |
| 4,551,388 | 11/1985 | Schlademan | 428/355 |
| 4,554,324 | 11/1985 | Husman et al. | 525/301 |
| 4,833,179 | 5/1989 | Young et al. | 522/183 |
| 4,851,278 | 7/1989 | Enanoza | 428/195 |
| 4,952,650 | 8/1990 | Young et al. | 526/194 |
| 4,988,567 | 1/1991 | Delgado | 428/402 |

FOREIGN PATENT DOCUMENTS

| | | | |
|---|---|---|---|
| 2455133 | 3/1982 | Germany | |
| 57-042778 | 3/1982 | Japan | C09J 3/14 |

OTHER PUBLICATIONS

U.S. application Ser. No. 07/660,358 "Hollow Acrylate Polymer Microspheres".
"Solvents", *Paint Testing Manual*, 13th Ed., Seward, G. G., Editor, American Society for Testing and Materials, Phila., Pa., 1972.
"A Three-Dimensional Approach to Solubility", *Journal of Paint Technology*, vol. 38, No. 496, pp. 269-280.

*Primary Examiner*—Joseph L. Schofer
*Assistant Examiner*—Wu C. Cheng
*Attorney, Agent, or Firm*—Gary L. Griswold; Walter N. Kirn; Janice L. Dowdall

[57] ABSTRACT

The invention relates to pressure-sensitive adhesive (PSA) structured bead, which has a distinct morphology, which is comprised of a copolymer which is characterized as a two-phase system wherein more rigid, thermoplastic segments (hydrophilic segments formed from the polymerization of water soluble monomer in the water-in-oil emulsion particles) provide discrete reinforcing micro-domains within a predominating continuous matrix formed by rubbery, viscoelastic polymer segments (formed from the polymerization of the ester and the polar monomer). The invention also relates to a method of making the beads via a polymerization of a water-in-oil emulsion in a water suspension.

2 Claims, No Drawings

METHOD FOR MAKING STRUCTURED SUSPENSION PSA BEADS

This is a continuation of application Ser. No. 07/882,373 filed May 6, 1992, now abandoned, which is a continuation of application Ser. No. 07/707,848 filed May 30, 1991 now abandoned.

TECHNICAL FIELD

The present invention relates to a novel method for aqueous suspension polymerization of acrylate copolymer beads.

BACKGROUND

The advantages of acrylic polymers as viscoelastic bases for pressure-sensitive adhesives are well known in the art. U.S. Pat. No. Re. 24,906 (Ulrich) cites many examples of these products. Initially, such compositions were made via solution polymerization. However, such methods of polymerization involved the use of large amounts of organic solvents. This was undesirable for both safety and economic reasons. Further, the necessity of an excess of such solvents in order to render the polymers transferable between containers drastically limited the handleability and transportability of the polymers.

Various methods of suspension or emulsion polymerization for copolymer pressure-sensitive adhesives have been disclosed in the art. Emulsion polymerization uses water as the reaction medium, and the polymerization takes place within a micelle which easily dissipates the exotherm due to the heat of polymerization. Because water is the solvent, the resulting emulsion is safer to handle. However, the pressure-sensitive adhesives made via emulsions differ in performance properties and/or coatability from those made via solutions depending on the techniques employed, i.e., emulsion-formed adhesives frequently exhibit decreased adhesion.

U.S. Pat. No. 3,691,140 discloses pressure-sensitive adhesive microspheres having average diameters of from 5 micrometers to about 150 micrometers formed via suspension polymerization in the presence of large amounts of surfactant. Upon standing after polymerization, the microspheres will separate into two or more phases. These microspheres are crosslinked to maintain their beaded configuration when coated. This results in a rough coating rather than a continuous coating.

U.S. Pat. No. 4,988,567 and U.S. application Ser. No. 660,358 now U.S. Pat. No. 5,053,436 discloses infusible and solvent insoluble hollow acrylate microsphers having multiple small voids and the processes for making them. The references teach processes including a process of polymerization of a water in oil in water emulsion, known as multiple emulsions, in which the concentration of emulsifier in water should be greater than its critical micelle concentration.

Suspension polymerization of pressure-sensitive adhesives without crosslinking and in the absence of large amounts of surfactant has been attempted, but keeping the polar monomers such as acrylic acid in the organic phase long enough for copolymerization with the alkyl acrylate monomers has been difficult. Japanese Laid-Open patent application No. 57-42778, published Mar. 10, 1982, discloses a pearl-shaped pressure-sensitive adhesive polymer obtained by suspension polymerization of, e.g., methacrylic acid in alkyl acrylates and a specially formulated dispersing agent consisting of a copolymer made of from 80–99.5% of a hydrophilic monomer and from 0.5–20% of a hydrophobic monomer. Conventional dispersing agents are disclosed which cause the resulting pearl-shaped polymers to block or agglomerate during polymerization. Furthermore, it is disclosed that even the specially formulated dispersing agents described may decrease the adhesive properties of the copolymer.

German Patent No. 24 55 133, published Mar. 4, 1982, discloses suspension polymerization of acrylate monomers into bead-shaped polymers. The polymer beads are coated with a crosslinking agent after polymerization to render them sensitive to radiation.

No water-soluble polar monomers are used in the adhesives. The beads themselves need not even be tacky; low adhesion values are disclosed as is the addition of conventional tackifying agents.

U.S. Pat. No. 3,786,116 discloses use of macromolecular monomers (macromers) in water-based polymerization systems. No pressure-sensitive adhesive systems are disclosed.

U.S. Pat. No. 4,554,324 discloses hot melt pressure-sensitive adhesives formed by copolymerization of macromers with alkyl acrylates to improve shear holding properties. Emulsion polymerization is disclosed, but not exemplified or preferred; all examples utilize solution polymerization.

U.S. Pat. No. 4,551,388 similarly discloses incorporation of from 1% to 30% methacrylate macromonomer by copolymerization.

U.S. Pat. No. 4,851,278, assigned to the assignee of the present application, discloses solvent polymerization of pressure-sensitive adhesives comprising zinc carboxylates and polystyrylethyl methacrylate macromonomers.

U.S. Pat. Nos. 4,952,650 and 4,833,179 assigned to the assignee of the present case, both incorporated by reference herein relate to a method for suspension polymerization of a pressure-sensitive acrylate copolymer bead having a glass transition temperature of 0° C. or less. The method comprises making a monomer premix comprising an acrylic acid ester of non-tertiary alcohol, the alcohol having from 1 to 14 carbon atoms, with the average number of carbon atoms being about 4 to about 12, a polar monomer copolymerizable with the acrylic acid ester, a chain transfer agent, a free-radical initiator, and a modifier moiety selected from the group consisting of 2-polystyrylethyl methacrylate macromolecular monomers, reactive zinc salts and hydrophobic silicas. The premix is then combined with a water phase containing a sufficient amount of suspending agent to form a suspension. The suspension is concurrently agitated and polymerization of the polymer premix is permitted until polymer beads are formed. The polymer beads are then collected. The amount of the modifier moiety must be sufficient to render the copolymer bead non-agglomerating at room temperature and safely handleable and transportable. The filtration products comprising the beads and water are easily handleable and easily and safely transportable. They are surprisingly free flowing, and do not agglomerate into unmanageable masses. They may be easily poured into tanks for transportation to distant manufacturing facilities. The beads are storage stable, and may be placed into storage tanks for long periods of time without undergoing physical or chemical degradation. Because the beads are stored wet rather than in organic solvents, they may be transported and stored without the elaborate safety and environmental procedures necessary when organic solvents are present. When dried, the polymers are inherently and permanently tacky.

Monomers with considerable solubility in water such as methacrylic acid may be copolymerized with acrylic or methacrylic ester by suspension polymerization. This is possible because, during the polymerization, the water miscible monomer may diffuse into the organic phase for copolymerization. But, as taught in U.S. Pat. No. 4,833,179, a zinc compound, such as zinc oxide must be used as a co-suspension agent to prepare a stable suspension.

It is not possible to fully react monomers having high water solubility, such as acrylic acid, acrylamide, etc. with water-insoluble monomers, such as acrylic or methacrylic esters via aqueous suspension polymerization. However, U.S. Pat. No. 4,833,179 teaches that, in such polymerizations, added electrolytes produce a salting-out effect and complete copolymerizations are possible. The brine solutions necessary for such reactions, however, render these reactions less desirable from an environmental viewpoint.

Therefore, a need exists for a method of making suspension PSA beads that can be prepared in the absence of a modifier moiety such as zinc oxide.

A need also exists for a method of making suspension PSAs in which highly water-soluble monomers can be incorporated into the polymer backbone in the absence of a brine solution.

A need also exists for a method of making suspension PSA beads that have improved adhesive properties, e.g., both high shear holding strength and high peel adhesion values.

Adhesives having high shear values have a high level of cohesive strength due to their crosslinked nature and/or high molecular weight which contributes to their high level of internal strength.

Adhesion relates to the wetting properties of an adhesive. In the past, in order to obtain good wetting properties, a low molecular weight adhesive was needed since a low molecular weight adhesive has better flow and is thus more able to "wet" and thus adhere to a substrate. However, low molecular weight adhesives have poor internal strength and thus poor shear.

In the past, it has been possible to have a high molecular weight adhesive having good shear strength but low adhesion. Also, it has been possible to have a low molecular weight adhesive having good wettability and thus high adhesion but a low shear strength due to its low molecular weight.

A need therefore exists for an adhesive which combines the advantages of both low molecular weight and high molecular weight adhesives (i.e., good adhesion and good shear). We have found such a method of PSA bead preparation.

The present invention involves a combination of emulsification and suspension polymerization processes such that monomers having high solubilities in water can be incorporated into the polymer backbone of the PSA beads. The PSA beads of the present invention have a distinctive morphology which is different from the suspension PSA beads disclosed in U.S. Pat. Nos. 4,833,179 and 4,952,650. The morphology of the suspension beads of the present invention is termed "structured beads" to differentiate from conventional suspension beads. Another unexpected benefit of the suspension beads prepared according to the method of the present invention is the improvement in adhesive properties. Although, not wishing to be bound by theory, we postulate that, during polymerization in the water-in-oil emulsion in water suspension, the polar monomers in the emulsion particles will graft onto or form blocks with the acrylate PSA bead backbone. The blocks or grafts thus formed contribute the desired high shear properties and the acrylate PSA backbone contributes high adhesion values desired in a good PSA.

Another benefit of the suspension process of the present invention is that suspension PSA beads can be prepared with or without zinc oxide. Zinc-free PSA can be advantageous in some applications.

In practicing the present invention, it is essential to employ both emulsification and suspension polymerization processes to prepare structured beads which have hydrophilic polymer domains, of the size typically associated with emulsion particles, within the suspension beads.

SUMMARY OF THE INVENTION

The present invention relates to a method for suspension polymerization of a pressure-sensitive acrylate copolymer bead having a glass transition temperature of 0° C. or less, comprising the steps of:

(a) combining an aqueous solution Phase I comprising:
 (i) about 20 to about 95 parts by weight water;
 (ii) about 5 to about 80 parts by weight water soluble monomer; wherein the amounts of (i) plus (ii) equals 100 parts by weight total;
 (iii) about 0 to about 1.0 percent by weight water soluble free radical initiator based on the total weight of (i) plus (ii); and
 (iv) about 0.5 to about 20 percent by weight of a surfactant selected from the group consisting of anionic surfactants, nonionic surfactants, and mixtures thereof, based on the total weight of (i) plus (ii), with a mixture Phase II comprising:
 (v) about 80 to about 99.5 parts by weight of acrylic acid ester of non-tertiary alcohol, said alcohol having from about 1 to about 14 carbon atoms, with the average number of carbon atoms being about 4 to about 12;
 (vi) about 0.5 to about 20 parts by weight of polar monomer copolymerizable with said acrylic acid ester; wherein the amounts of (v) plus (vi) equals 100 parts by weight total;
 (vii) about 0.01 to about 0.5 percent by weight of chain transfer agent based on the total weight of (v) plus (vi);
 (viii) about 0.05 to about 1 percent by weight of oil soluble free radical initiator based on the total weight of (v) plus (vi); and
 (ix) about 0.05 to about 30 percent by weight of a modifier moiety based on the total weight of (v) plus (vi);
wherein some or all of said surfactant in said Phase I is optionally alternatively included in said Phase II;
to form a water-in-oil emulsion, wherein said water-in-oil emulsion comprises about 1 to about 60 weight percent of a water phase comprising aqueous solution Phase I, and about 40 to about 99 weight percent of an oil phase comprising mixture Phase II based upon the total weight of said water-in-oil emulsion;

(b) combining about 10 to about 60 weight percent of said water-in-oil emulsion with about 40 to about 90 weight percent of a water Phase III wherein said percentages are based upon the total weight of said water-in-oil emulsion and Phase III, in order to form a water-in-oil emulsion in a water suspension; and wherein said water Phase III comprises:

(x) about 100 parts by weight water; and
(xi) about 0.01 to about 5 parts by weight of a suspension agent;

wherein some or all of said polar monomer in said mixture Phase II is optionally alternatively included in said water Phase III;

(c) concurrently agitating and heating said suspension to a temperature of about 40° C. to about 60° C. and permitting polymerization of said monomers in the water-in-oil emulsion until polymer beads are formed; and (d) collecting said polymer beads;

wherein some or all of said modifier moiety is optionally alternatively included in one or more of the following: Phase III, the water-in-oil emulsion, the water-in-oil emulsion in a water suspension; an aqueous suspension of polymer beads after exotherm of the polymerization has been reached.

Unless otherwise noted, all percentages, parts, and ratios herein are by weight.

DETAILED DESCRIPTION OF THE INVENTION

Method of Preparing the Structured Copolymer Beads

The method of the present invention involves preparing an aqueous Phase I by combining water, water soluble monomer, surfactant (wherein some or all of the surfactant can optionally alternatively be included in Phase II), and optional water soluble initiator in the prescribed ratio under mild agitation at room temperature (i.e., about 21° C. to about 25° C.) until the water soluble monomer and optional water soluble initiator dissolve in the water. Preferably, the method and each phase set forth above consists essentially of the listed steps and components, respectively.

The aqueous Phase I is combined with a monomer mixture Phase II comprising acrylic acid ester, chain transfer agent, free-radical initiator, surfactant (optionally), copolymerizable polar monomer (some or all of which can be optionally alternatively be included in Phase III) and any other optional components in the prescribed ratio in order to form a water-in-oil emulsion by homogenizing the two phases via vigorous agitation.

The water-in-oil emulsion is then combined with an aqueous Phase III comprising water, a suspension agent, optional polar monomer, and optional surfactant in the prescribed ratio and subjected to agitation in order to form a water-in-oil emulsion in a water suspension.

Polymerization of the water-in-oil emulsion in a water suspension occurs with agitation for from about 2 to about 16 hours at a temperature of from about 40° C. to about 90° C. to give an aqueous suspension of copolymer beads. The beads are then separated from the water by means such as gravity filtration and washed. The filtered product also generally comprises about 15 to about 30 weight percent water in addition to the copolymer beads.

The useful, preferred, and most preferred ranges of components for inclusion in Phase I, Phase II, and Phase III, respectively, are set forth in Table A. The Summary of the Invention as written incorporates the useful ranges. The preferred and most preferred numerical ranges in Table A can be substituted for those in the Summary of the Invention in order to determine the exact amounts of preferred and most preferred ranges. The bases on which the percentages are calculated etc. remain the same. The relative amounts of Phase I, Phase II, and Phase III used in forming the water-in-oil emulsion in a water suspension are set forth in Table B. The ranges in Tables A and B are approximate and thus the word "about" should be inserted by the reader in front of each value in the indicated ranges.

The pressure-sensitive adhesive (PSA) structured bead of the present invention, which has a distinct morphology, is comprised of a copolymer which is characterized as a two-phase system wherein more rigid, thermoplastic segments (hydrophilic segments formed from the polymerization of water soluble monomer in the water-in-oil emulsion particles) provide discrete reinforcing micro-domains within a predominating continuous matrix formed by rubbery, viscoelastic polymer segments (formed from the polymerization of the ester and the polar monomer).

The term "morphology", as used herein, refers to the presence of distinct reinforcing micro domains in a continuous matrix comprised of the softer, rubbery polymer domains.

The morphology achieved by the method of the invention distinguishes the copolymer beads of the PSA compositions of the present invention from the randomly polymerized acrylic copolymer beads of identical monomer compositions, and contributes to the desirable properties of high shear holding with balanced adhesion exhibited by the PSA prepared according to the method of the invention.

Phase I

Water soluble monomers useful in Phase I include both moderately polar and strongly polar monomers. Polarity or hydrogen-bonding ability is frequently described by the use of terms such as "moderately", "strongly" and "poorly". References describing these and other solubility terms include: "Solvents", *Paint Testing Manual*, 3rd Ed. Seward, G. G., Editor, American Society for Testing and Materials, Phila, Pa, 1972, and "A Three-Dimensional Approach to Solubility", *Journal of Paint Technology*, Vol. 38, No. 496, pp. 269–280, both incorporated by reference herein. Strongly polar monomers useful herein include acrylic acid, methacrylic acid, itaconic acid, hydroxyalkyl acrylates, styrene sulfonic acid, sodium styrene sulfonate, maleic acid, fumaric acid, citraconic acid, acrylamides, and N-alkyl acrylamides such as n-octyl acrylamide, t-butyl acrylamide, N, N-dimethyl acrylamide, and mixtures thereof. Moderately polar monomers useful herein include N-vinyl lactams such as N-vinyl pyrrolidone or N-vinyl caprolactam, dimethyl amino-propyl methacrylate, and monopolyethoxy acrylates such as those available under the trademark Carbowax ™ from Union Carbide and mixtures thereof. Preferred water soluble monomers include acrylic acid, methacrylic acid, N-vinyl pyrrolidone (NVP), monopolyethoxy acrylates, acrylamides, and mixtures thereof. These monomers are preferred since they are difficult to polymerize by conventional methods.

Examples of useful water soluble initiators include but are not limited to thermal free radical initiators selected from the group consisting of ammonium persulfate, potassium persulfate, hydrogen peroxide, and redox initiator systems such as potassium persulfate-sodium metabisulfite or cumene hydroperoxide-sodium metabisulfite and mixtures thereof.

Phase II

The alkyl acrylate monomers useful in Phase II of the present invention are monofunctional unsaturated acrylate ester monomers. Such monomers include but are not limited to those selected from the group consisting of isooctyl acrylate, isononyl acrylate, 2-ethylhexyl acrylate, decyl acrylate, dodecyl acrylate, n-butyl acrylate, hexyl acrylate, and mixtures thereof. Preferred monomers include those selected from the group consisting of 2-ethylhexyl acrylate, isooctyl acrylate, isononyl acrylate, butyl acrylate, and mixtures thereof for reasons of commercial availability.

Polar monomers useful in Phase II according to the method of the invention include those selected from the group consisting of moderately polar monomers, strongly polar monomers, and mixtures thereof. Polarity or hydrogen-bonding ability is frequently described by the use of terms such as "moderately", "strongly" and "poorly". References describing these and other solubility terms include "Solvents", *Paint Testing Manual*, 3rd Ed. Seward, G. G. Editor, American Society for Testing and Materials, Phila, Pa., 1972 CH 2.7; and "A Three-Dimensional Approach to Solubility", *Journal of Paint Technology*, Vol. 38, No. 496, pp 269–280, both incorporated by reference herein. Strongly polar monomers useful herein include methacrylic acid, itaconic acid, hydroxyalkyl acrylates, styrene sulfonic acid, sodium styrene sulfonate, maleic acid, fumaric acid, citraconic acid, and N-alkyl acrylamides such as n-octyl acrylamide, t-butyl acrylamide, and N,N-dimethyl acrylamide. Moderately polar monomers useful herein include N-vinyl lactams such as N-vinyl pyrolidone (NVP), N-vinyl caprolactam, acrylonitrile, dimethyl amino-propyl methacrylate, and vinyl chloride. Preferred polar monomers include methacrylic acid, NVP, N-alkyl acrylamides, sodium sytrene sulfonate, and mixtures thereof. These polar monomers may be added to the monomer premix (Phase II); alternatively, they may be added to the dispersion medium of Phase III. Preferably they are added to Phase III in order to provide increased stability of the suspension during polymerization.

Initiators for inclusion in Phase II are those which are normally suitable for free-radical polymerization of acrylate monomers and which are oil-soluble and have low solubility in water, e.g., organic peroxides such as benzoyl peroxide, lauryl peroxide, and various thermal initiators. Preferred thermal initiators include 2,2'-azobisbutryronitrile, commercially available from E. I. dupont de Nemours under the trade name Vazo ™ 64.

Useful conventional chain transfer agents for inclusion in Phase II include but are not limited to those selected from the group consisting of mercaptans such as isooctyl thioglycolate and dodecyl mercaptan, alcohols such as ethanol and isopropanol, and carbon tetrahalides such as carbon tetrabromide and carbon tetrachloride, and mixtures thereof. Isooctyl thioglycolate and carbon tetrabromide are preferred.

Optionally, conventional photocrosslinking agents may also be included in Phase II according to the methods of the invention. Preferred crosslinking agents include but are not limited to those selected from the group consisting of copolymerizable aromatic ketone monomers, especially acryloxybenzophenone. When present, the photocrosslinker generally comprises from about 0.01 to about 5.0 percent by weight based on the total weight of components (v) plus (vi).

Modifier moieties useful in Phase II according to the method of the present invention include polystyrl methacrylate macromolecular monomers (macromers), zinc oxide or reactive zinc salts, and hydrophobic silica. Preferred moieties include the zinc oxide and the macromers. A variety of useful macromers and methods for their preparation are disclosed in U.S. Pat. No. 3,786,116, incorporated by reference herein. A particularly useful 1-polystyrylethyl methacrylate macromonomer is commercially available under the name Chemlink 4500 ™. This macromer is a high glass transition temperature ($T_g$) polymeric material, having a $T_g$ of about 90° C., or higher, and a molecular weight of from about 5,000 to about 25,000. The modifier moiety if used is typically present in an amount ranging from about 0.05 to about 30 percent based upon the total weight of components (v) plus (vi). The preferred level of modifier moiety varies with the selection of the moiety, i.e., a preferred level of macromer ranges from 1 to about 15 percent by weight based on the total weight of (v) plus (vi). The macromet is added to the Phase II or the water-in-oil emulsion in a water suspension formed by combining Phase II and Phase III; preferably Phase II. The reactive zinc salts may be added Phase III or to the water-in-oil emulsion in a water suspension formed by combining Phase II and Phase III; preferably Phase III. Hydrophobic silica may be added to Phase II. Alternatively, hydrophobia silica may be added to the suspension after the exotherm has been reached (i.e., near the end or after the polymerization has been polymerized).

The surfactants which can be used according to the present invention and which can be added to Phase I, Phase II, or both to prepare water-in-oil emulsions include those selected from the group consisting of nonionic surfactants, anionic surfactants, and mixtures thereof.

Examples of nonionic surfactants which can be used in the present invention have an HLB of from about 1 to about 15, preferably about 2 to about 9, most preferably about 4 to about 6. The HLB of an emulsifier is an expression of its Hydrophile-Lipophile Balance, i.e., the balance of the size and strength of the hydrophilic (water-loving or polar) and the lipophilic (oil-loving or non-polar) groups of the emulsifiers. Among the nonionic surfactants suitable for use in the present invention are polyethers, e.g., ethylene oxide and propylene oxide condensates in general, which include straight- and branched $C_2$ to $C_{18}$ alkyl, alkylaryl and alkenyl alcohol based copolymers of ethylene oxide and propylene oxide such as the Tergitol ® X series of surfactants from Union Carbide Co., block copolymers of ethylene oxide and propylene oxide such as Pluronic ® and Tetronic ® surfactants from BASF Co. Other suitable non-ionic surfactants are the "Tweens and Spans", which are the trademarked compositions of ICI Inc., denoting polyoxyalkylene derivatives of sorbitan and fatty acid esters.

Among the anionic surfactants suitable for use in the present invention are poly(alkyleneoxy) sulfates or sulfonates with HLB of the poly(alkyleneoxy) compounds from about 1 to about 9, preferably from about 3 to about 6. The poly(alkyleneoxy) compounds are ethylene oxide and propylene oxide or ethylene oxide and butylene oxide condensates in general, which include straight- and branched $C_2$ to $C_{18}$ alkyl, alkyl aryl, and alkenyl alcohol-based copolymers of ethylene oxide and propylene oxide or ethylene oxide and butylene oxide, such as Mazon-SAM ™ surfactants from PPG Industries.

Phase III

Phase III comprises water, a suspension agent, optionally anionic surfactant, and optionally polar monomer. "Suspension agents" also referred to herein as "suspending agents" are those conventionally used in suspension polymerization processes. They may be minimally water-soluble inorganic salts such as tribasic calcium phosphate, calcium carbonate, calcium sulfate, barium sulfate, barium phosphate, hydrophilic silicas, and magnesium carbonate. Preferred inorganic suspending agents include barium sulfate, hydrophilic silicas, and tribasic calcium phosphate. Water-soluble organic suspending agents may also be used, e.g., polyvinyl alcohol, poly-N-vinyl pyrrolidone, polyacrylic acid, polyacrylamide, and hydroxyalkyl cellulose. The suspending agent is present in amounts ranging from about 0.01 to about 5 parts by weight.

The copolymer beads of the invention are prepared by an aqueous suspension polymerization technique utilizing conventional suspension agents with optional anionic surfactants. When present, the amount of surfactant used in Phase III should be below the critical micelle concentration. Preferred surfactants include those selected from the group consisting of sodium lauryl sulfate, sodium dioctyl sulfosuccinate, and mixtures thereof. Non-ionic surfactants may also be included so long as an anionic surfactant is present and predominates (i.e., comprises greater than 50% of the total surfactant in Phase III), and the total amount of combined surfactants does not exceed their critical micelle concentration.

The amount of surfactant which can be included in Phase III ranges from about 0 to about 2 percent by weight, preferably about .00025 percent to about 1 percent by weight, and most preferably about 0.001 percent to about 0.5 percent by weight based on the total weight of components (x) plus (xi).

Polar monomers useful in Phase III according to the method of the invention are the same polar monomers described as being useful in Phase II (above).

Compositions made by the process of the invention may also contain one or more conventional additives. Preferred additives include tackifiers, plasticizers, pigments and dyes, extenders, fillers, antioxidants, stabilizers and multifunctional crosslinkers. When present, the additives are preferrably added to Phase II. An especially preferred additive is bis-vinyl ether. When present, this additive generally comprises from about 0.1 to about 40 percent by weight based on the total weight of components (v) plus (vi).

Methods of Manufacture

Copolymer beads of the present invention are useful in any applications in which acrylate adhesives otherwise produced may be used. In order to make adhesive compositions, the copolymer beads may be coated from water or solvents or extruded. Such coating or extruding destroys the bead configuration and results in a continuous film of pressure-sensitive adhesive. These adhesive compositions may be applied to a backing or substrate using any conventional means such as roller coating, dip coating or extrusion coating. If the composition is to be used as a tape, it is coated onto a flexible carrier web; if it is to be used as a transfer film, it may be applied to a release liner such as a silicone-coated paper.

Test Methods

The test methods used in evaluation of various examples of the invention for determining peel adhesion and shear are those described by the American Society for Testing and Materials and in *Test Methods for Pressure-Sensitive Tapes*, Eighth Edition, August 1985, Pressure-Sensitive Tape Council, Glenview, Ill.

Peel Adhesion

ASTM P3330-78 PSTC-1 (11/75)

Peel adhesion is the force required to remove a coated flexible sheet material from a test panel measured at a specific angle and rate of removal. In the examples this force is expressed in Newtons per 100 mm (N/100 mm) width of coated sheet. The procedure follows:

1. A 12.5 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself, so the angle of removal will be 180 degrees. The free end is attached to the adhesion tester scale.
3. The glass test plate is clamped in the jaws of the tensile testing machine which is capable of moving the plate away from the scale at a constant rate of 2.3 meters per minute.
4. The scale reading in Newtons is recorded as the tape is peeled from the glass surface. The data is recorded as the average value of the range of numbers observed during the test.

Shear Holding Strength

Reference: ASTM: D3654-78; PSTC7

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm by 12.5 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces thus insuring that only the shear forces are measured in an attempt to more accurately determine the holding power of the tape being tested. The time elapsed for each tape example to separate from the test panel is recorded as the shear strength.

The following examples are intended to be illustrative, and should not be construed as limiting the invention. The examples employ materials as follows:

| Abbreviation | Material |
| --- | --- |
| IOA | isooctyl acrylate |
| IOTG | isooctyl thioglycolate |
| Mac | polystyrene macromer |
| ZnO | zinc oxide |
| NVP | N-vinyl pyrrolidone |
| AA | acrylic acid |
| MAA | methacrylic acid |
| PSA | pressure sensitive adhesive |
| ACM | acrylamide |
| D.I. Water | deionized water |
| Nalcoag 1042 | a colloidal silica available from Nalco |
| Mazon-SAM ™ 211 | a copolymerizable surfactant available from PPG Industries |
| Ex. | Example |
| ppm | parts per million |
| % | percent |

EXAMPLES 1–5

The structured suspension PSA beads of Formulations 1 to 5 corresponding to Examples 1 to 5 set forth in Table C were prepared as follows. An aqueous solution of the water soluble monomer (Phase I) and the organic monomer mixture (Phase II) set forth in Table C were prepared separately. Phases I and II were then homogenized in a Waring ™ blender which yielded a stable water-in-oil emulsion. A two liter split flask equipped with a condenser, thermometer, nitrogen inlet, motor-driven agitator, and a heating mantle with temperature control was then charged with the Phase III ingredients (in Table C). The reactor was heated to 58° C. and maintained at this temperature. At this point, the water-in-oil emulsion (i.e., the pre-homogenized Phases I and II), was added to the reactor while vigorous agitation (700 RPM) was being maintained to obtain a good suspension. The reaction was continued with nitrogen purging throughout the polymerization. After exotherm, the reaction was maintained at 75° C. for another 2 hours, and then cooled down to room temperature for recovering the PSA beads.

The PSA beads were then collected by using a Buchner funnel and washed several times with deionized water. The resulting filtration product also contained about 15 to 30% of water and was stable for storage, transportation and handling for further processing. These beads were dried then dissolved in ethyl acetate solution and baked from solution to a dried thickness of 25 micrometers on a 37 micrometer polyester film. The coated film was tested for peel adhesion and shear strength. Results are summarized in Table D.

CONTROL

EXAMPLE 6

The control suspension PSA beads have the same polymer composition as in Example 5, but without the structured morphology. The hydrophilic monomer N-vinyl pyrrolidone in Table C, Example 5, was directly added into the IOA monomer mixture (Phase II) without the surfactant Mazon-SAM ™ 211 and homogenization (i.e., no water-in-oil emulsion was made prior to the suspension polymerization). The monomer mixture containing N-vinyl pyrrolidone was then dispersed in the dispersion medium (Phase III) and polymerized by the suspension process described in U.S. Pat. No. 4,833,179, incorporated by reference herein. The adhesive properties of the control suspension beads are shown in Table E.

The data contained in Table E clearly demonstrates that the structured beads (i.e., Example 5), with their unique combination of high $T_g$ dispersed phase and low $T_g$ continuous phase, show both the high peel adhesion values and the high shear values necessary for high performance PSA applications.

While this invention has been described in connection with specific embodiments, it should be understood that it is capable of further modification. The claims herein are intended to cover those variations which one skilled in the art would recognize as the chemical equivalent of what has been described here.

TABLE A

|  | Useful (Parts by Weight) | Preferred (Parts by Weight) | Most Preferred (Parts by Weight) |
| --- | --- | --- | --- |
| Phase I |  |  |  |
| Water | 20 to 95 parts | 30 to 70 parts | 40 to 60 parts |
| Water Soluble Monomer | 5 to 80 parts | 30 to 70 parts | 40 to 60 parts |
| Water Soluble Initiator | 0 to 1% | 0 to 0.8% | 0 to 0.5% |
| Surfactant[1] | 0.5 to 20% | 1 to 10% | 2 to 5% |
| Phase II |  |  |  |
| Acrylic Acid Ester | 80 to 99.5 parts | 82 to 98 parts | 90 to 97 parts |
| Polar Monomer[2] | 0.5 to 20 parts | 2 to 18 parts | 3 to 10 parts |
| Chain Transfer Agent | 0.01 to 0.5% | 0.03 to 0.4% | 0.05 to 0.3% |
| Free Radical Initiator | 0.05 to 1% | 0.1 to 0.8% | 0.3 to 0.5% |
| Modifier Moiety[3] | 0.05 to 30% | 1 to 15% | 3 to 10% |
| Phase III |  |  |  |
| Water | 100 parts | 100 parts | 100 parts |
| Suspension Agent | 0.01 to 5 parts | 0.02 to 3 parts | 0.05 to 2 parts |

[1]The percent by weight of surfactant is based on the total weight of (i) plus (ii) [water plus water soluble monomer]. Some or all of the surfactant may optionally alternatively be included in Phase II.
[2]Some or all of the polar monomer may optionally alternatively be included in Phase III.
[3]The percent by weight of modifier moiety is based on the total weight of (v) plus (vi) [ester plus polar monomer]. Some or all of the modifier moiety may optionally alternatively be included in Phase III, said water-in-oil emulsion, said water-in-oil emulsion in a water suspension, an aqueous suspension of polymer beads after the exotherm of the polymerization has been reached.

TABLE B

|  | Useful (Weight %) | Preferred (Weight %) | Most Preferred (Weight %) |
| --- | --- | --- | --- |
| A. Water-in-Oil Emulsion: (Phase I in Phase II Emulsion) | | | |
| Water Phase I | 1–60 | 5–40 | 10–30 |
| Oil Phase II | 99–40 | 95–60 | 90–70 |
| B. Water-in-Oil Emulsion in Water Suspension: (Phase I in Phase II Emulsion in Phase III Suspension) | | | |
| Water-in-Oil Emulsion | 10–60 | 30–55 | 40–50 |
| Water Phase III | 90–40 | 70–45 | 60–50 |

TABLE C

| Formulation | Ex. 1 (grams) | Ex. 2 (grams) | Ex. 3 (grams) | Ex. 4 (grams) | Ex. 5 (grams) |
| --- | --- | --- | --- | --- | --- |
| Phase I |  |  |  |  |  |
| D.I. Water | 29 | 29 | 26 | 26 | 26 |
| Polar Monomer | ACM 21 | ACM 21 | AA 26 | NVP 26 | NVP 26 |

TABLE C-continued

| Formulation | Ex. 1 (grams) | Ex. 2 (grams) | Ex. 3 (grams) | Ex. 4 (grams) | Ex. 5 (grams) |
|---|---|---|---|---|---|
| Ammonium Persulfate | — | — | 0.1 | — | 0.16 |
| Phase II | | | | | |
| IOA | 432 | 432 | 432 | 432 | 432 |
| IOTG | 0.25 | 0.25 | 0.25 | 0.25 | 0.25 |
| Styrene Macromer | 13 | 13 | 13 | — | 13 |
| Mazon-SAM ™ 211 | 1.6 | 1.6 | 1.6 | 1.6 | 1.6 |
| Vazo ™ 64 Initiator | 2.5 | 2.5 | 2.5 | 2.5 | 2.5 |
| Phase III | | | | | |
| D.I. Water | 610 | 610 | 610 | 610 | 610 |
| MAA | 20 | 20 | 20 | 20 | 20 |
| ZnO | 2.5 | — | — | 2.5 | 2.5 |
| Nalcoag ™ 1042 | 4.4 | 4.4 | 4.4 | 4.4 | 4.4 |

TABLE D

Adhesive Properties of Structured Suspension PSAs of the Invention

| Example | Composition Matrix/ Dispersed Phase | 180° C. Peel Adhesion (N/100 mm) | Shear (minutes) (12.5 mm × 12.5 mm − 1 kg) |
|---|---|---|---|
| 1 | (IOA/MAA/Mac)/ (AcM + H₂O) with ZnO | 56 | 280 |
| 2 | (IOA/MAA/Mac)/ (AcM + H₂O) without ZnO | 49 | 65 |
| 3 | (IOA/MAA/Mac)/ (AA + H₂O) without ZnO | 56 | 125 |
| 4 | (IOA/MAA)/ (NVP + H₂O) with ZnO | 53 | 1,800 |
| 5 | (IOA/MAA/Mac)/ (NVP + H₂O) | 58 | 37,000 |

TABLE E

Adhesive properties of Control Example 6 and Example 5

| Example | 180° Peel Adhesion (N/100 mm) | Shear (12.5 mm × 12.5 mm − 1 kg) (minute) |
|---|---|---|
| Control (non-structured PSA beads) | 60 | 5000 |
| Example 5 (structured PSA beads) | 58 | 37,000 |

What is claimed is:

1. A pressure-sensitive adhesive acrylate copolymer bead having a glass transition temperature of 0° C. or less, wherein said bead has a structured morphology, wherein said acrylate copolymer comprises a copolymer comprising monomers selected from the group consisting of acrylate esters of non-tertiary alcohols and mixtures thereof, copolymerized with polar monomer selected from the group consisting of moderately polar monomers, strongly polar monomers, and mixtures thereof, and copolymerized with water soluble monomer selected from the group consisting of acrylamide, acrylic acid, N-vinyl pyrrolidone and mixtures thereof; wherein about 80 to about 99.5 parts by weight acrylic acid ester of non-tertiary alcohol and about 0.5 to about 20 parts by weight polar monomers is present based upon 100 parts by weight total of said acrylic acid ester plus said polar monomer.

2. The pressure-sensitive adhesive acrylate copolymer bead of claim 1 wherein said polar monomer is methacrylic acid.

* * * * *

UNITED STATES PATENT AND TRADEMARK OFFICE
CERTIFICATE OF CORRECTION

PATENT NO.: 5,374,698

DATED: December 20, 1994

INVENTOR(S): Chung I. Young and Ying-Yuh Lu

It is certified that error appears in the above-identified patent and that said Letters Patent is hereby corrected as shown below:

Col. 8, line 23, "macromet" should be --macromer--.

Signed and Sealed this

Ninth Day of April, 1996

Attest:

BRUCE LEHMAN

Attesting Officer

Commissioner of Patents and Trademarks